(12) United States Patent
Shimizu et al.

(10) Patent No.: US 10,768,702 B2
(45) Date of Patent: Sep. 8, 2020

(54) DISPLAY DEVICE

(71) Applicant: KYOCERA Corporation, Kyoto-shi, Kyoto (JP)

(72) Inventors: Takashi Shimizu, Kusatsu (JP); Takeshi Shintani, Ritto (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 15/893,170

(22) Filed: Feb. 9, 2018

(65) Prior Publication Data

US 2018/0284893 A1  Oct. 4, 2018

(30) Foreign Application Priority Data

Mar. 28, 2017  (JP) .................................. 2017-63191
Mar. 29, 2017  (JP) .................................. 2017-65753

(51) Int. Cl.
*G06F 3/01*  (2006.01)
*G06F 3/041*  (2006.01)
(Continued)

(52) U.S. Cl.
CPC ............ *G06F 3/016* (2013.01); *G06F 1/1626* (2013.01); *G06F 1/1637* (2013.01); *G06F 1/1643* (2013.01); *G06F 3/041* (2013.01); *G06F 3/0414* (2013.01); *G02F 1/13338* (2013.01); *G02F 2001/133311* (2013.01); *G02F 2001/133394* (2013.01); *G02F 2201/36* (2013.01); *G06F 2203/04103* (2013.01); *G06F 2203/04105* (2013.01)

(58) Field of Classification Search
CPC . G06F 3/01; G06F 3/016; G06F 3/011; G06F 3/017; G06F 3/0416; G06F 3/0488; G06F 3/014
See application file for complete search history.

(56) References Cited

U.S. PATENT DOCUMENTS 6,016,134 A * 1/2000 Ota ..................... G02F 1/13338
178/18.03
6,522,322 B1 * 2/2003 Maeda .................... G06F 3/045
178/18.05
(Continued)

FOREIGN PATENT DOCUMENTS

JP  2014-006672 A  1/2014
JP  2015-141499 A  8/2015

*Primary Examiner* — Olga V Merkoulova
(74) *Attorney, Agent, or Firm* — Volpe and Koenig, P.C.

(57) ABSTRACT

A display device includes: a display panel having a display section; an operation panel disposed so as to cover the display panel, the operation panel having an operation surface which is located on an opposite side to a side facing the display panel; vibrating bodies disposed on the operation panel; a support disposed on the side facing the display panel so as to face the operation panel apart therefrom; elastic supporting members disposed between the operation panel and the support, the elastic supporting members being elastically deformable in accordance with vibration of the vibrating bodies; and a ventilatable wall member disposed across the operation panel and the support so as to externally surround the display section, the wall member being composed of a mesh structure deformable in accordance with the vibration of the vibrating bodies.

14 Claims, 9 Drawing Sheets

(51) Int. Cl.
*G06F 1/16* (2006.01)
*G02F 1/1333* (2006.01)

(56) References Cited

U.S. PATENT DOCUMENTS

| | | | |
|---|---|---|---|
| 8,593,420 B1 | 11/2013 | Buuck | |
| 2008/0068342 A1* | 3/2008 | Chang | G06F 3/0412 345/173 |
| 2009/0079706 A1* | 3/2009 | Mishima | G02F 1/13338 345/173 |
| 2011/0032091 A1* | 2/2011 | Park | G06F 3/016 340/407.2 |
| 2015/0187189 A1* | 7/2015 | Kono | G06F 3/041 340/407.1 |
| 2015/0199011 A1* | 7/2015 | Fukumoto | G06F 3/016 345/173 |

* cited by examiner

DISPLAY DEVICE

BACKGROUND

1. Technical Field

The present disclosure relates to a display device presenting a tactile sense using vibration.

2. Description of the Related Art

In recent years, a touch panel presenting an operator with a tactile sense using vibration has been mounted in portable information devices such as a smartphone and a tablet PC, various consumer devices including home appliances such as a microwave oven, a television and lighting equipment, and various industrial equipment such as an automated teller machine, an automatic ticket machine, and a vending machine.

CITATION LIST

Patent Literature

Patent Literature 1: JP-A 2014-6672

SUMMARY

An object of the present disclosure is to provide a highly reliable tactile sense transmission type display device in which a good tactile sense is presented with the degradation of the vibration efficiency suppressed.

A display device of the present disclosure includes: a substrate having a display section; a vibrating body disposed on the substrate; a support disposed so as to face the substrate apart therefrom; an elastic supporting member disposed between the substrate and the support, the elastic supporting member being elastically deformable in accordance with vibration of the vibrating body; and a wall member disposed across the substrate and the support so as to externally surround the display section, the wall member including a pressure variation relaxation section which relaxes pressure variation caused by the vibrating body in a space surrounded by the wall member.

In addition, a display device of the present disclosure includes: a display panel having a display section; an operation panel disposed so as to cover the display panel, the operation panel having an operation surface which is located on an opposite side to a side facing the display panel; a vibrating body disposed on the operation panel; a support disposed on the side facing the display panel so as to face the operation panel apart therefrom; an elastic supporting member disposed between the operation panel and the support, the elastic supporting member being elastically deformable in accordance with vibration of the vibrating body; and a wall member disposed across the operation panel and the support so as to externally surround the display section, the wall member including a pressure variation relaxation section which relaxes pressure variation caused by the vibrating body in a space surrounded by the wall member.

According to the display device of the present disclosure, since the wall member including the pressure variation relaxation section is provided, pressure variation caused by the vibrating body in a space surrounded by the wall member can be suppressed, and decrease of the efficiency of the vibration generated by the vibrating body can be suppressed.

BRIEF DESCRIPTION OF THE DRAWINGS

Other and further objects, features, and advantages of the present disclosure will be more explicit from the following detailed description taken with reference to the drawings wherein.

DETAILED DESCRIPTION

Figure 1:
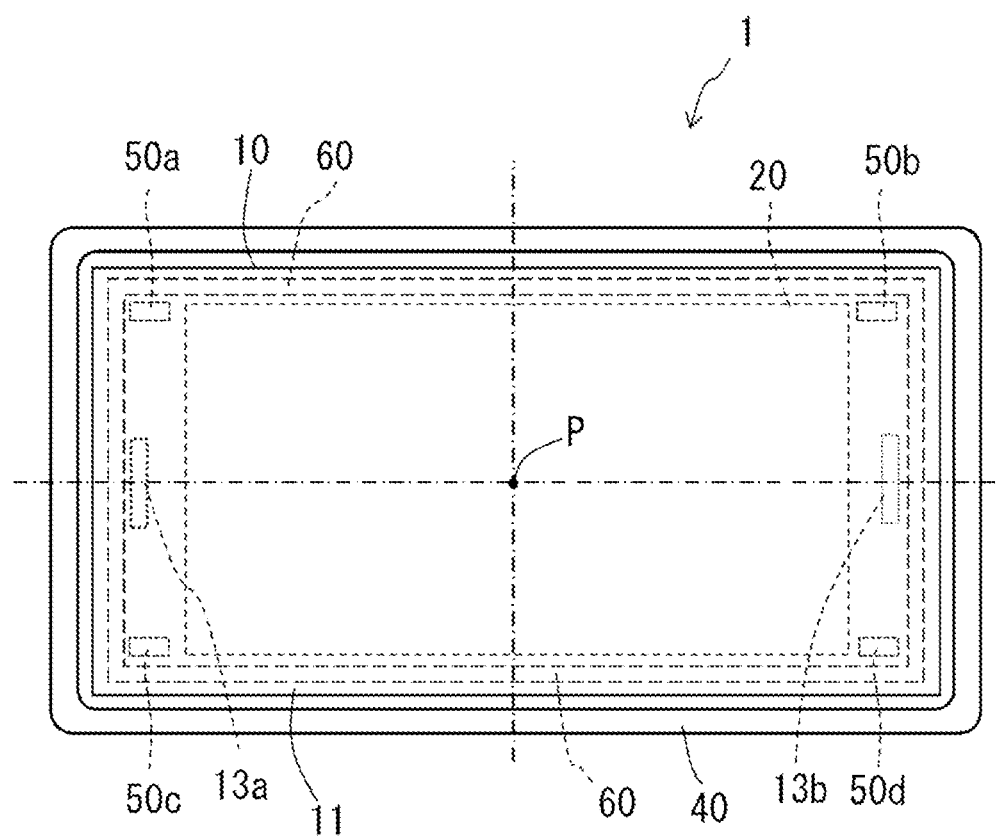
FIG. 1 is a plan view of an example of a display device according to a first embodiment.

Now referring to the drawings, preferred embodiments of the present disclosure is described below.

Figure 2:
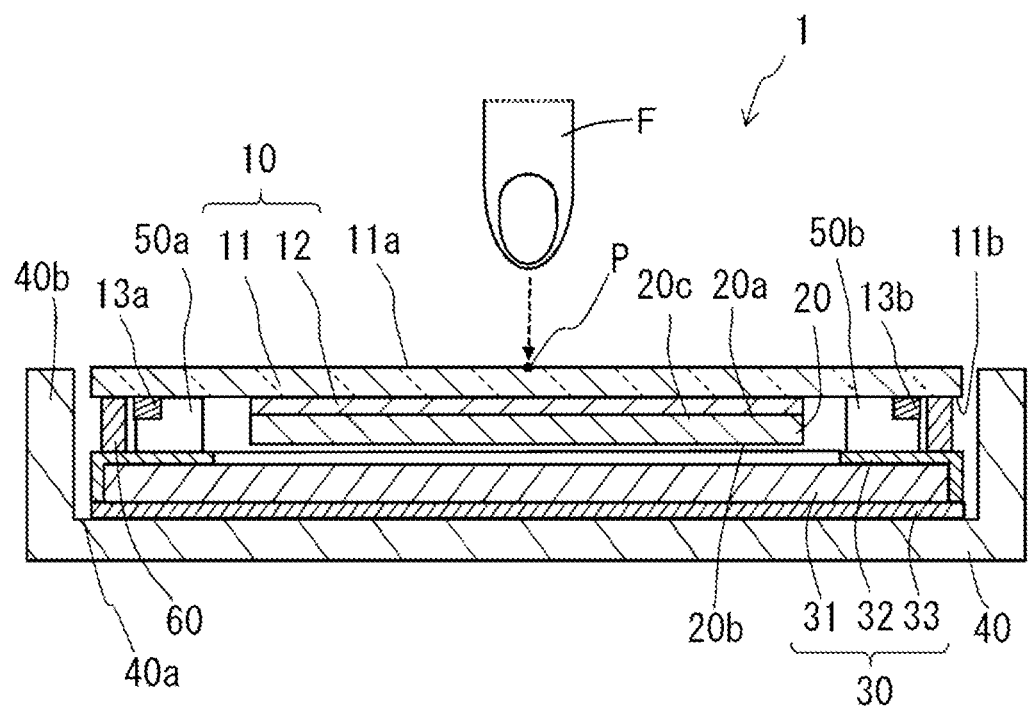
FIG. 2 is a cross-sectional view of an example of the display device according to the first embodiment.

FIG. 1 is a plan view of an example of a display device according to a first embodiment. FIG. 2 is a cross-sectional view of the exemplified display device according to the first embodiment, and schematically illustrates a cross-section including vibrating bodies 13a and 13b of the display device of FIG. 1. In FIG. 2, a thickness direction of the display device is enlargedly illustrated for purposes of explanation. A liquid crystal display device 1, which is an example of a display device, includes a liquid crystal display panel 20 which is a display panel, on a rear surface of a transparent touch panel 10 which is an operation panel, and a backlight unit 30 which is a support, is further disposed on a rear surface of the liquid crystal display panel 20, and the liquid crystal display device 1 is constituted by housing the touch panel 10, the liquid crystal display panel 20 and the backlight unit 30 in a housing 40.

In the display device of the present disclosure illustrated in FIGS. 1 and 2, a substrate having a display section has a complex structure in which a touch detection section 12 and the liquid crystal display panel 20 are stacked on one main surface (a rear surface) of a transparent protection plate 11 formed of, for example, a glass substrate or a plastic substrate.

The display panel including the display section can be, for example, the liquid crystal display panel 20 including a liquid crystal display section as the display section, but the display panel of the present disclosure is not limited to the liquid crystal display panel 20, but may be a self light emitting display panel such as an organic EL (Electroluminescence) display panel, an inorganic EL display panel, or a light emitting diode (LED) display panel.

The vibrating bodies 13a and 13b are disposed in an peripheral portion (an edge portion) on the rear surface of the transparent protection plate 11 included in the substrate in positions outside the liquid crystal display panel 20 in a plan view thereof. Besides, the vibrating bodies 13a and 13b are disposed in positions opposing each other. In this case, vibration generated by the vibrating bodies 13a and 13b can easily occur uniformly in the entire substrate. Alternatively, the vibrating bodies 13a and 13b may be disposed on the other main surface (a front surface) of the transparent protection plate 11.

The support is a supporting substrate composed of a light guiding panel 31 of the backlight unit 30. In a peripheral portion on a surface (a light irradiation surface) of the light guiding panel 31 opposing a non-display surface 20b of the liquid crystal display panel 20, a projected portion (a flange portion) of a frame body 32 is disposed, and the transparent protection plate 11 is supported on the projected portion via elastic supporting members 50a, 50b, 50c and 50d.

A wall member 60 is disposed across the substrate and the support so as to externally surround the display section, is deformable in accordance with the vibration generated by the vibrating bodies 13a and 13b, and has void portions which are constituted by a mesh structure to be ventilatable. The wall member 60 specifically has void portions constituted by a mesh structure such as non-woven fabric, a flocculent material, an air filter, or an HEPA (high efficiency particulate air) filter, and the size of an opening can be adjusted to be ventilatable. The size of the opening can be adjusted, with the mesh structure caused to contain, for example, fiber and an adhesive, by adjusting a combination of the contents or the like of the fiber and the adhesive. In this manner, the wall member 60 having a suitable ventilation property can be obtained. In the wall member 60, there may be or may not be a gradient in the density of the void portions (openings) in a ventilating direction.

In the ventilatable wall member 60 of the present disclosure, a pressure loss of air passing through the wall member 60 during the vibration of the substrate (for example, a pressure loss caused assuming that an air passing speed is 20 cm/sec.) is preferably in a range of 0.1 pascal to 100 pascals (Pa). If the pressure loss is less than 0.1 Pa, dust and dirt tend to easily pass through the wall member 60. If the pressure loss exceeds 100 Pa, the wall member 60 is degraded in the ventilation property, and hence, resistance of the wall member 60 to the air passing through the wall member 60 easily becomes large. As a result, the wall member 60 impairs the vibration of the substrate, and thus, the efficiency of the vibration is easily lowered. The pressure loss is more preferably 0.1 Pa to 50 Pa, and further preferably 0.1 Pa to 40 Pa. Incidentally, the passing speed of the air passing through the wall member 60 during the vibration of the substrate is about 1 cm/sec. to 100 cm/sec., and the pressure loss may be 0.1 Pa to 100 Pa within this range of the passing speed.

The pressure loss can be measured as follows. When the air passes through the wall member 60, the wall member 60 serves as the resistance to the air, and hence, a difference is caused between a pressure on an inlet side of the wall member 60 and a pressure on an outlet side of the wall member 60. This pressure difference can be measured with a manometer (such as a U-tube manometer or an inclined manometer) connected to a measurement duct. The difference between the pressure on the inlet side of the wall member 60 (an upstream static pressure) and the pressure on the outlet side of the wall member 60 (a downstream static pressure) caused when the wall member 60 is used at a predetermined air passing speed (of, for example, 20 cm/sec.) is defined as the pressure loss (unit: Pa).

The touch detection section 12 constituting the touch panel 10 is disposed in parallel to and apart, in a thickness direction of the light guiding panel 31, from the light guiding panel 31 of the backlight unit 30 which is the supporting substrate. In the touch panel 10, an operation surface 11a is a surface of the transparent protection plate 11 which is located on the opposite side to the light guiding panel 31 (i.e., a surface on the side of an operator, or a surface on the side of a viewer), and the touch detection section 12 is disposed on the rear surface 11b of the transparent protection plate 11 which is located on the opposite side to the operation surface 11a.

The touch panel 10 includes the touch detection section 12 disposed on the rear surface 11b of the transparent protection plate 11. The transparent protection plate 11 is, for example, in a rectangular shape in a plan view thereof, and can be formed of a glass plate, a plastic plate or the like. The shape in a plan view of the transparent protection plate 11 is not limited to the rectangular shape, but may be a polygonal shape such as a triangular shape or a pentagonal shape, a trapezoidal shape, any of these shapes having rounded corners, or a wholly curved shape such as a circular shape or an elliptical shape. The transparent protection plate 11 has the operation surface 11a that can be operated by touching with a finger F or a stylus by an operator. There is a gap between the edge of the transparent protection plate 11 and the housing 40, through which the air can pass.

On the rear surface 11b of the transparent protection plate 11 which is located on the opposite side of the operation surface 11a, the touch detection section 12 is disposed. The touch detection section 12 is in the shape of a thin film, and in a plan view thereof, is in a rectangular shape smaller than the transparent protection plate 11. The shape in a plan view of the touch detection section 12 may be a shape similar to any of the above-described various shapes in a plan view of the transparent protection plate 11. The touch detection section 12 can detect a position on the operation surface 11a touched with the finger F or the stylus. As a detection method, a capacitance sensing method, a resistance film method or the like can be employed. Although the touch detection section 12 is disposed between the transparent protection plate 11 and the liquid crystal display panel 20 in the present embodiment, the touch detection section 12 may be built in the liquid crystal display panel 20, or disposed outside the liquid crystal display device.

The display device of the present disclosure does not necessarily include the touch detection section 12, and the touch detection section 12 may be omitted. The touch detection section 12 may be omitted if, for example, the vibrating bodies 13a and 13b formed of a piezoelectric material themselves have a structure for detecting position change of a touch with the finger F or the stylus.

On the rear surface 11b of the transparent protection plate 11, the vibrating bodies 13a and 13b (hereinafter, generically referred to as the "vibrating body (vibrating bodies) 13" with the indexes a and b omitted), which are a plurality of vibrating bodies, are disposed. The vibrating bodies 13a and 13b are disposed, for example, respectively along two opposing sides of the rectangular operation surface 11a of the transparent protection plate 11. Besides, the vibrating bodies 13a and 13b are disposed, in a plan view thereof, at positions point-symmetrical about a center P of the operation surface 11a of the rectangular transparent protection plate 11. The vibrating bodies 13a and 13b may be disposed in direct contact with the transparent protection plate 11 so as to directly transmit the vibration to the transparent protection plate 11, or may be disposed above the transparent protection plate 11 with another member disposed therebetween so as to indirectly transmit the vibration. Besides, when an operator touches the operation surface 11a with the finger F or the stylus, the touch detection section 12 detects the position of the touch, and the operation surface 11a is vibrated by the vibrating bodies 13 on the basis of detected information, so that the operator can sense the vibration via the finger F or the stylus.

The vibrating body 13 is composed of a piezoelectric body such as a ceramic piezoelectric body or a polymer piezoelectric body, an eccentric motor, a linear vibrator, a shape memory alloy or the like. As a material of the ceramic piezoelectric body, barium titanate ($BaTiO_3$), lead titanate ($PbTiO_3$), lead zirconate titanate ($Pb[Zr_xTi_{1-x}]O_3$, wherein $0<x<1$, mixed crystal: PZT), potassium niobate ($KNbO_3$), lithium niobate ($LiNbO_3$), lithiumtantalate ($LiTaO_3$), sodium tungstate ($Na_xWO_3$), zinc oxide (ZnO, $Zn_2O_3$), $Ba_2NaNb_5O_5$, $Pb_2KNb_5O_{15}$, lithium tetraborate ($Li_2B_4O_7$), sodium potassium niobate ($(K,Na)NbO_3$), sodium bismuth titanate ($Na_{0.5}Bi_{0.5}TiO_3$) or the like can be employed. As a material of the polymer piezoelectric body, polyvinylidene fluoride (1,1-2 ethane fluoride polymer: PVDF) or the like can be employed.

The frequency of the vibration generated by the vibrating bodies 13 is about 30 Hz to 300 Hz, and as tactile vibration for providing a good tactile sense to a human finger, the frequency is preferably about 150 Hz to 250 Hz. The amplitude of the vibration is about 30 μm to 1000 μm, and as the tactile vibration for providing a good tactile sense to a human finger, the amplitude is preferably about 50 μm to 150 μm. Each vibrating body 13 can be in an appearance shape of a rectangular parallelepiped, a cube, a plate, or a columnar body such as a cylinder. The vibrating body 13 may be directly attached to the transparent protection plate 11, or may be indirectly attached via a vibration transmission member formed of a metal, a resin or the like. Besides, as long as the touch panel 10 can be vibrated, the vibrating body 13 may be attached to any position, for example, on a side surface of the transparent protection plate 11.

The liquid crystal display panel 20, which is the display panel, is disposed on the opposite side to the operation surface 11a of the touch panel 10. The liquid crystal display panel 20 is, for example, in the shape of a rectangle smaller than the touch panel 10 in a plan view thereof, and the touch panel 10 is disposed so as to cover the liquid crystal display panel 20. The shape in a plan view of the liquid crystal display panel 20 may be a shape similar to any of the above-described various shapes in a plan view of the transparent protection plate 11. The liquid crystal display panel 20 includes a display surface 20a and the non-display surface 20b. The liquid crystal display panel 20 includes the display section (the liquid crystal display section) 20c in a center portion thereof, and the touch detection section 12 is positioned so as to cover at least the display surface 20a corresponding to the display section 20c. Besides, although the liquid crystal display panel 20 is in contact with the rear surface of the touch panel 10 in the present embodiment, the liquid crystal display panel 20 may be disposed to be spaced from the touch panel 10.

The backlight unit 30, which is the support, is disposed so as to face the non-display surface 20b of the liquid crystal display panel 20 apart therefrom. The backlight unit 30 includes the light guiding panel 31, the frame body 32 disposed in the periphery of the guiding panel 31, and a conductor plate 33 on which the light guiding panel 31 is placed and which also serves as a ground conductor. The backlight unit 30 is configured so that light from a light source which is built therein and composed of an LED or the like can be emitted toward the liquid crystal display panel 20 via the light guiding panel 31. The frame body 32 and the conductor plate 33 are formed of a metal such as aluminum.

In order to avoid that the liquid crystal display panel 20 and the backlight unit 30 impede the vibration generated by the vibrating bodies 13, a distance (a height) of a space provided between the liquid crystal display panel 20 and the backlight unit 30 is preferably about 1 mm to 5 mm, and more preferably about 1 mm to 3 mm from the viewpoint of thickness reduction.

The housing 40 is, for example, in a rectangular shape in a plan view thereof, and has a bottom surface 40a in the center thereof, and a frame portion 40b which is the periphery of the bottom surface 40a. On the bottom surface 40a, the backlight unit 30, the liquid crystal display panel 20 and the touch panel 10 are stacked in the stated order. The backlight unit 30 is placed and fixed to the bottom surface 40a of the housing 40. The frame portion 40b corresponding to the periphery of the bottom surface 40a protects the side surfaces of the backlight unit 30, the liquid crystal display panel 20 and the touch panel 10. As a material of the housing 40, for example, a plastic or a metal can be used.

On the rear surface 11b of the transparent protection plate 11 of the touch panel 10, the elastic supporting members are disposed. In the present embodiment, the elastic supporting members 50a, 50b, 50c and 50d (hereinafter, generically referred to as the elastic supporting member(s) 50 with the indexes a, b, c and d omitted) are disposed in the four corners of the rectangular transparent protection plate 11. As the elastic supporting members 50, it is possible to use a member having a property to be displaced in accordance with the vibration of the vibrating bodies 13 so as to little attenuate the vibration of the operation panel, the member being formed of a rubber such as urethane rubber or silicone rubber, a resin or the like. Alternatively, a spring member such as a spring coil or a leaf spring may be used.

These elastic supporting members 50 are disposed between the frame body 32 of the backlight unit 30 which is the support and the transparent protection plate 11 which is the operation panel. The elastic supporting members 50 support the transparent protection plate 11. Besides, each elastic supporting member 50 has one end in contact with the frame body 32 and the other end in contact with the rear surface 11b of the transparent protection plate 11. The elastic supporting members 50 are held and fixed, with an adhesive or the like, onto the frame body 32 and the transparent protection plate 11 so as not to move from the disposed positions. If the operation panel and the display panel are integrally formed, a structure in which one end of each elastic supporting member 50 is fixed to the non-display surface of the display panel with the other end fixed to the support can be employed.

If the liquid crystal display panel 20 is used as the display panel, the backlight unit 30 can be used as the support, but if a display panel not requiring a backlight unit including a light guiding panel, such as a self light emitting display panel like an organic EL (Electroluminescence) display panel or a light emitting diode (LED) display panel, is used, the housing 40 may be used as the support.

The wall member 60 is disposed across the rear surface 11b of the transparent protection plate 11 and the frame body 32 of the backlight unit 30. The wall member 60 is disposed so as to surround the liquid crystal display panel 20 serving as the display section. In other words, the wall member 60 is disposed across the operation panel and the support so as to externally surround the display section. Although the wall member 60 serves as a partition between a space inside the wall member 60 including the display section and a space outside the wall member 60, the wall member 60 includes a large number of void portions which are a pressure variation relaxation section, and hence, the space inside the wall member 60 and the space outside the wall member 60 communicate with each other through the void portions. The wall member 60 is composed of a member having a large number of continuous pores, and can be formed by using, for example, an ultra-high molecular weight polyethylene porous film (trade name: "SUNMAP", manufactured by Nitto Denko Corporation), or any of the above-described deformable members such as non-woven fabric, a flocculent material, an air filter, and an HEPA filter. Thus, the space inside the wall member 60 and the space outside the wall member 60 communicate with each other to be ventilatable through the void portions such as pores. An ultra-high molecular weight polyethylene porous film is produced, for example, by preparing a sintered porous molded body of an ultra-high molecular weight polyethylene powder, and cutting the resultant into a desired shape and size. Incidentally, a pressure loss of the wall member 60 formed of the ultra-high molecular weight polyethylene porous film (trade name: "SUNMAP", manufactured by Nitto Denko Corporation) was measured, and found to be 40 Pa when the wall member 60 had a thickness of 0.32 mm and an air passing speed was 20 cm/sec.

Figure 3:
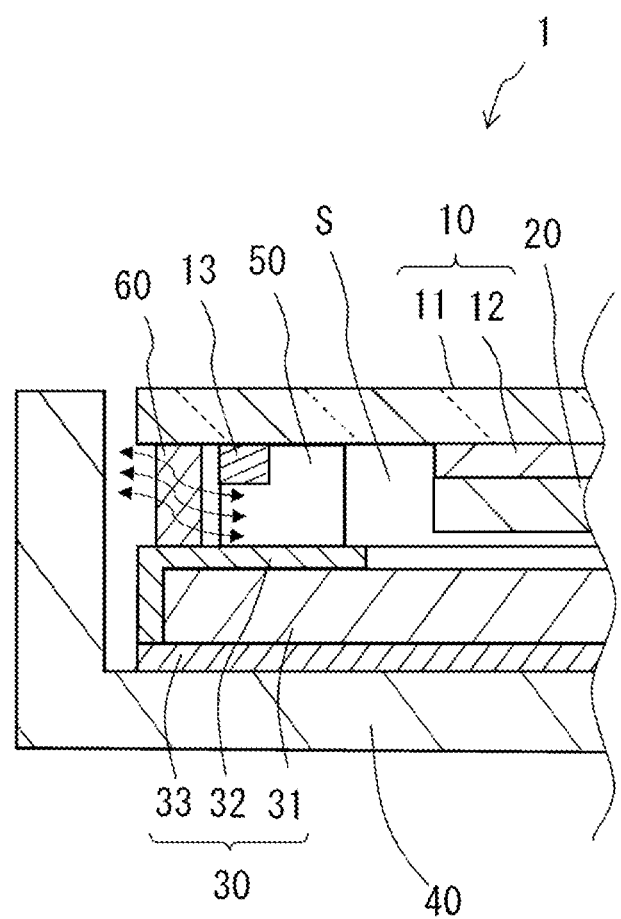
FIG. 3 is an enlarged cross-sectional view for explaining an air flow in the vicinity of a wall member.

FIG. 3 is an enlarged cross-sectional view for explaining an air flow in the vicinity of the wall member 60. The space between the liquid crystal display panel 20 and the backlight unit 30 is configured to have such a high airtight structure as to prevent dust from entering the space between the liquid crystal display panel 20 and the backlight unit 30, in many cases. If the vibrating bodies 13 are attached to such a display device to construct a display device presenting a tactile sense, however, an air pressure within a high airtight space between the liquid crystal display panel 20 and the backlight unit 30 is largely varied due to the vibration of the vibrating bodies 13. Besides, the air pressure variation thus occurring in the space between the liquid crystal display panel 20 and the backlight unit 30 may affect components such as the housing 40, in addition to the operation panel in which the tactile sense is to be presented, and it is apprehended that sense of use of a tactile sense and the like may be impaired. Furthermore, the vibration is diffused and attenuated, and hence, the display device is difficult to be efficiently vibrated.

Therefore, as the wall member 60, the member which is deformable in accordance with the vibration of the vibrating bodies 13 and includes the void portions is used. Since the wall member 60 deforms in accordance with the vibrating bodies 13, the vibration of the vibrating bodies 13 is difficult to be transmitted to the housing 40 via the wall member 60. Therefore, the vibration of the vibrating bodies 13 is not diffused to the component such as the housing 40, and hence, the touch panel 10 can be efficiently vibrated.

Besides, although slight volume change is caused in the space S inside the wall member 60 owing to the vibration of the transparent protection plate 11, if the space S has a high airtightness, the air pressure variation in the space S is increased, and hence, the vibration may be transmitted to the housing 40, or the vibration energy may be easily diffused and attenuated through the pressure loss or the like. Therefore, the wall member 60 is provided with the void portions so as to make the space S communicate with the space outside the wall member 60 through the void portions. Thus, air corresponding to the volume change of the space S flows through the wall member 60, so as to suppress the air pressure variation in the space S. In this manner, the air pressure variation in the space inside the wall member 60 caused by the vibration of the vibrating bodies 13 is relaxed so that attenuation of the vibration of the transparent protection plate 11 included in the operation panel can be suppressed. Therefore, the transparent protection plate 11 can be efficiently vibrated. Accordingly, increase of the electric power for driving the vibrating bodies 13 can be suppressed.

Besides, since the wall member 60 need not support the touch panel 10 or the liquid crystal display panel 20 differently from the elastic supporting members 50, the wall member 60 need not have rigidity as that of the elastic supporting members 50, and may have a small thickness as long as dust can be prevented from entering the space S inside the wall member 60, and preferably has lower rigidity than the elastic supporting members 50 because the air pressure variation in the space S inside the wall member 60 can be thus reduced. For example, a volume occupancy ratio of the void portions, that is, a volume ratio of a portion of the wall member 60 where the void portions are present in a region of the wall member 60 including the void portions, is preferably 40% or more and less than 100%. In other words, a ratio of a resin or fiber constituting walls of the void portions is preferably 60% or less of the portion where the void portions are present. If the volume occupancy ratio of the void portions is less than 40%, the ventilation property of the wall member 60 is degraded, and hence, the efficiency of the vibration generated by the vibrating bodies 13 tends to be easily lowered. The volume occupancy ratio of the void portions is more preferably 80% or more and less than 100%, and further preferably 90% or more and less than 100%.

As long as the ventilation between the space S inside the wall member 60 and the space outside the wall member 60 is sufficiently attained, the region including the void portions may be provided in merely a part of the wall member 60 with the remaining region constituted by a member having no void portions. Besides, if the whole wall member 60 is constituted by a material having the void portions, the ventilation between the space inside the wall member 60 and the space outside the wall member 60 can be improved. In this manner, the air pressure variation in the space S inside the wall member 60 can be reduced, and the attenuation of the vibration of the transparent protection plate 11 included in the operation panel can be further suppressed, so as to more efficiently vibrate the transparent protection plate 11.

In the wall member 60, the void portions are constituted by a mesh structure, and the mesh structure is a structure in which a large number of mesh-shaped voids are formed by entangling a linear material or a fibrous material, or a structure in which a large number of regular mesh-shaped voids are formed by a linear material, a fibrous material or a wall material continuous as a whole, and for example, is a structure of non-woven fabric, a flocculent material, woven fabric, a fishing net, an insect net, a honeycomb or the like. The wall member 60 may include such a mesh structure in at least a part thereof. The mesh structure used in the display device of the present disclosure does not embrace a dense material having a porous structure in which a large number of pores are formed in a base formed by using a dense material of a flexible continuous structure made of a resin such as polyurethane foam rubber, or the like. If the wall material 60 is formed by using such a flexible dense material as a base, although it is ventilatable, it is difficult to obtain a ventilation property sufficient for suppressing the air pressure variation in the space S inside the wall member 60 caused by the vibration of the transparent protection plate 11, and hence, the vibration energy may be easily diffused and attenuated through the pressure loss. A specific example of the mesh structure includes an air cleaning filter (trade name: "Filtrete", manufactured by 3M Company). Besides, the mesh structure may be an electrostatic charged material such as an electrostatic charged filter, and a dust collecting effect can be thus improved. The mesh structure has, for example, the pressure loss of 0.1 Pa to 100 Pa (as a value obtained at an air passing speed of 20 cm/sec.), and a thickness of about 0.5 mm to 5 mm. If the wall member 60 including such a mesh structure is used, the flow passage resistance of the void portions of the wall member 60 can be reduced, and hence, the attenuation of the vibration of the transparent protection plate 11 included in the operation panel is further suppressed, and the transparent protection plate 11 can be more efficiently vibrated. Incidentally, the pressure loss of two types (different in the density of the voids) of wall members 60 using the air cleaning filter (trade name: "Filtrete", manufactured by 3M Company) was measured, and found to be 5 Pa to 7 Pa when the wall member 60 had a thickness of 2 mm and the air passing speed was 20 cm/sec.

Further, in the case where the mesh structure constituting the void portions of the wall member 60 is a structure in which a large number of regular mesh-shaped voids are formed by a linear material, a fibrous material or a wall material continuous as a whole, the mesh structure is preferably a structure having a regular mesh portion and a large number of branch portions extending in a branch shape from the regular mesh portion. In this case, since the large number of branch portions are present in the voids, dust and the like are easily trapped by the large number of branch portions.

Besides, each void of the wall member 60 preferably has a structure in which an opening facing the space inside the wall member 60 and an opening facing the space outside the wall member 60 are connected to each other in a straight tubular shape. In other words, in at least one of the opening of the void facing the space inside the wall member 60 and the opening of the void facing the space outside the wall member 60, when the inside of the wall member 60 is seen from the opening of the void, the substance of the wall member 60 is preferably present to obstruct at least a part of the opening. Incidentally, a structure in which the substance of the wall member 60 obstructs at least a part of the opening includes a structure in which a portion of the void present inside the wall member 60 is narrower than the opening. By having such a structure, the substance of the wall member 60 present to obstruct at least a part of the opening easily traps dust and the like. Each of the opening facing the space inside the wall member 60 and the opening facing the space outside the wall member 60 formed by each void of the wall member 60 has a size, for example, in terms of an average opening diameter in a unit area (1 cm$^2$), of about 10 μm to 300 μm, but the size is not limited to this range.

For example, if the amplitude of the vibration of the transparent protection plate 11 generated by the vibrating bodies 13 is about 150 μm to 300 μm, which is large (namely, has large vibration energy) as the tactile vibration, an HEPA filter having particle removal efficiency of 99.97% or more for dust having a particle size of about 0.3 μm, and having performance (defined in JIS 28122) of an initial pressure loss of 245 Pa or less may be used as the wall member 60. An HEPA filter is a kind of air filters used for purposes of removing dust and dirt from air to obtain clean air, and is used as a filter for an air cleaner or a clean room.

Figure 4:
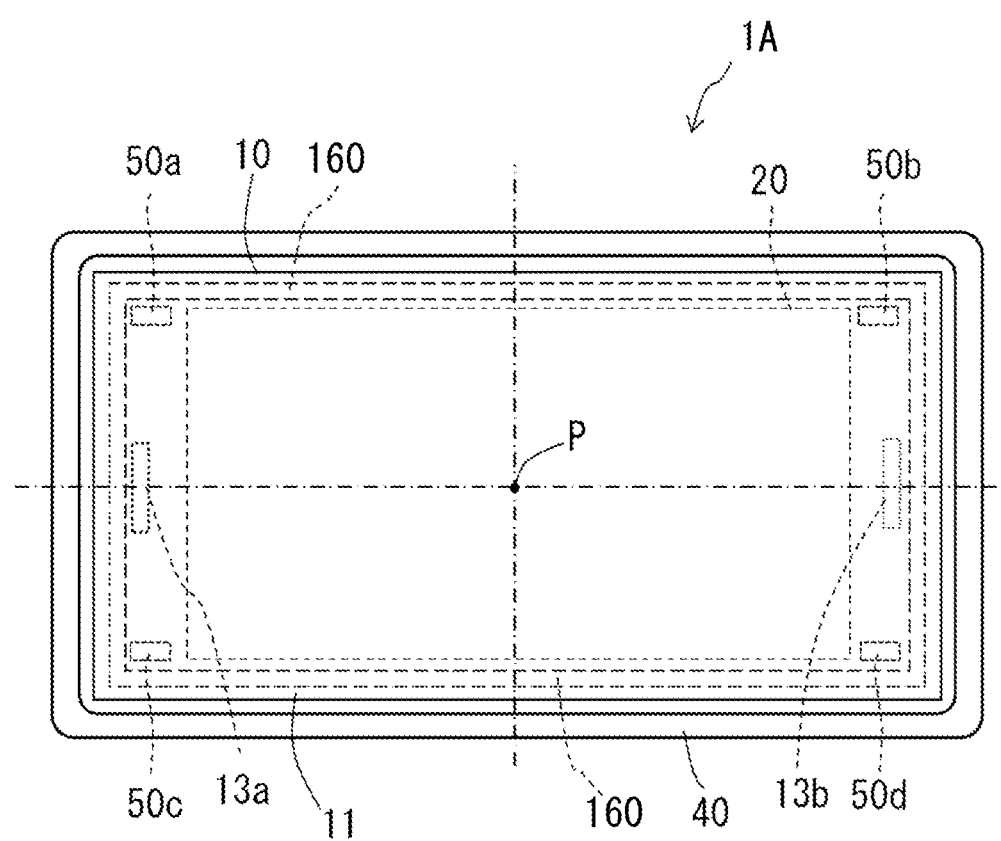
FIG. 4 is a plan view of an example of a display device according to a second embodiment.
Figure 5:
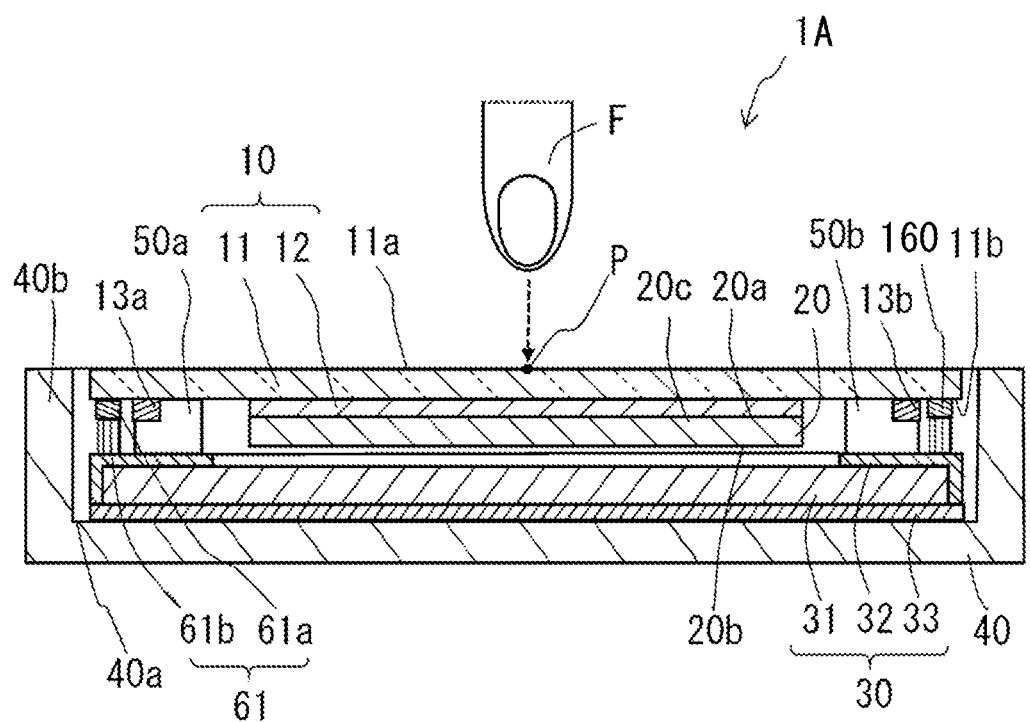
FIG. 5 is a cross-sectional view of an example of the display device according to the second embodiment.

FIG. 4 is a plan view of an example of a display device according to a second embodiment. FIG. 5 is a cross-sectional view of an example of the display device according to the second embodiment, and schematically illustrates a cross-section including vibrating bodies 13a and 13b of the display device of FIG. 4. In FIG. 5, a thickness direction of the display device is enlargedly illustrated for purposes of explanation. A liquid crystal display device 1A which is an example of the display device includes a liquid crystal display panel 20, that is, a display panel, on a rear surface of a transparent touch panel 10 which is an operation panel, and further includes a backlight unit 30 which is a support, disposed on a rear surface of the liquid crystal display panel 20, and is constituted by housing the touch panel 10, the liquid crystal display panel 20 and the backlight unit 30 in a housing 40.

The liquid crystal display device 1A according to the second embodiment is similar to the liquid crystal display device 1, and corresponding parts are denoted by the same reference numerals and descriptions thereof will be omitted. The liquid crystal display device according to the second embodiment is provided with a wall member 160, instead of the wall member provided in the liquid crystal display device according to the first embodiment.

The wall member 160 is disposed across the rear surface 11b of the transparent protection plate 11 and the frame body 32 of the backlight unit 30. The wall member 160 is disposed to surround the display section 20c of the liquid crystal display panel 20. In other words, the wall member 160 is disposed across the operation panel and the support so as to externally surround the display section. The wall member 160 serves as a partition between a space inside the wall member 160 including the display section 20c and a space outside the wall member 160, and at least a part of the wall member 160 includes a flexible wall member 61, which is the pressure variation relaxation section, formed of a material that can easily bent by the vibration of the vibrating bodies 13a and 13b. Needless to say, the entire wall member 160 may be the flexible wall member 61. In a space surrounded by the transparent protection plate 11, the backlight unit 30 and the wall member 160, the transparent protection plate 11 is vibrated in accordance with the vibration generated by the vibrating bodies 13a and 13b, so as to displace the position of the transparent protection plate 11 against the backlight unit 30. The flexible wall member 61 is formed of a flexible material that can be bent. Besides, there is a gap between the housing 40 and the touch panel 10, and the space outside the wall member 160 is in communication with outside air.

The flexible wall member 61 includes, for example, a base member 61a, and flexible linear materials 61b extending from the base member 61a toward the backlight unit 30. The base member 61a is fixed to the transparent protection plate 11 on the side of the transparent protection plate 11 as a fixed end of the flexible wall member 61. One end of each flexible linear material 61b is fixed to the base member 61a, and the other end thereof is a free end, and is in contact with the backlight unit 30. The flexible linear materials 61b are composed of a plurality of fibrous members each having a thickness of 10 μm or more and 300 μm or less. As a material of the flexible linear materials 61b, resins such as polyethylene terephthalate (PET), triacetyl cellulose (TAC), polyvinyl chloride (PVC), polyvinyl alcohol (PVA), and polypropylene (PP), and rubbers such as a silicone rubber, a urethane rubber, and an acrylic rubber can be used.

In the present embodiment, the base member 61a is formed of a flexible material such as a resin of polyurethane, silicone or the like, or cloth, is in a frame-like shape in a plan view thereof, and is fixed to the transparent protection plate 11 which is the operation panel with an adhesive or the like. A large number of the flexible linear materials 61b, which extend from the base member 61a toward the backlight unit 30, are disposed in a brush-like shape on the base member 61a, and are disposed across the base member 61a fixed to the transparent protection plate 11 and the backlight unit 30 so as to externally surround the liquid crystal display panel 20 which is the display section. Besides, the flexible wall member 61 including the flexible linear materials 61b has a natural length larger than a distance between the transparent protection plate 11 and the backlight unit 30 in a standard state where no specific operation is performed, and therefore, at least some of the flexible linear materials 61b are in contact with the backlight unit 30. A distance between adjacent ones of the flexible linear materials 61b is 10 μm or more and 300 μm or less. Owing to gaps among the flexible linear materials 61b, the space inside the wall member 160 and the space outside the wall member 160 are in communication with each other. The wall member 160 has a thickness of about 0.01 mm to 0.3 mm. Since the flexible linear materials 61b are thus densely disposed over a prescribed thickness, the wall member 160 having both a ventilation property and a dust proof property can be obtained. Incidentally, in the display device of the present disclosure, the base member 61a may be formed of a resin having no flexibility, a metal, a ceramic or the like, and the flexible linear materials 61b may be fixed to the base member 61a with an adhesive or the like.

Although some of the flexible linear materials 61b constituting the flexible wall member 61 are arranged along a direction parallel to a direction of air passing in a plan view thereof, they are preferably arranged along a direction inclined to the direction of air passing in a plan view thereof. In this case, a flow passage of air passing through the flexible wall member 61 becomes complex, and dust and the like are easily trapped.

The flexible linear materials 61b constituting the flexible wall member 61 is preferably configured to have a stem portion and a large number of branch portions extending in a branch shape from the stem portion. In this case, dust and the like are easily trapped by the large number of branch portions.

Figure 6:
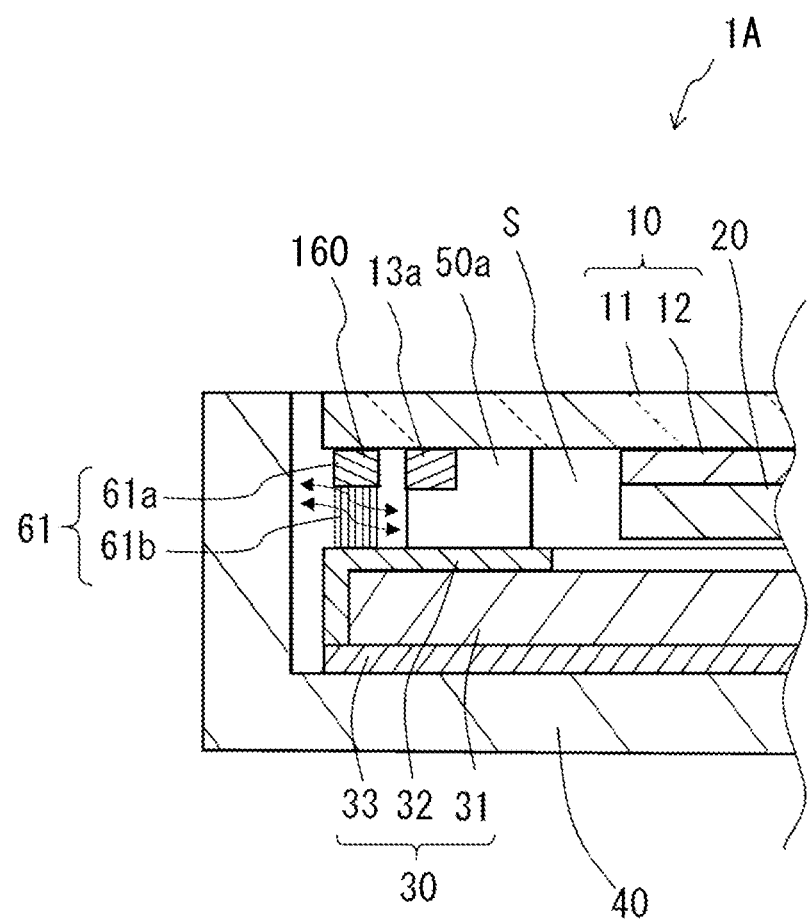
FIG. 6 is an enlarged cross-sectional view for explaining an air flow in the vicinity of a wall member.

FIG. 6 is an enlarged cross-sectional view for explaining an air flow in the vicinity of the wall member 160. The space between the liquid crystal display panel 20 and the backlight unit 30 is configured to have such a high airtight structure as to prevent dust from entering the space S between the liquid crystal display panel 20 and the backlight unit 30, in many cases. If the vibrating bodies 13a and 13b are attached to such a display device to construct a display device presenting a tactile sense, however, an air pressure within a high airtight space S between the liquid crystal display panel 20 and the backlight unit 30 is largely varied due to the vibration of the vibrating bodies 13a and 13b. Besides, the air pressure variation thus occurring in the space S between the liquid crystal display panel 20 and the backlight unit 30 may affect a component, such as the housing 40, in addition to the panel in which the tactile sense is to be presented, and it is apprehended that sense of use may be impaired. Furthermore, the vibration is diffused and attenuated, and hence, the display device is difficult to be efficiently vibrated.

Therefore, the wall member 160 has the structure including the flexible wall member 61 having one end which is a fixed end fixed to either of the operation panel or the support, and the other end which is a free end. Although the touch panel 10 is displaced in a direction vertical to the operation surface 11a by the vibrating bodies 13a and 13b, the flexible wall member 61 having a ventilation property is deformed in accordance with the displacement of the transparent protection plate 11, so as to suppress the air pressure variation caused by the volume change of the space S surrounded by the operation panel, the support and the wall member 60. Besides, since one end of the flexible wall member 61 is a free end and is not fixed, the vibration of the vibrating bodies 13a and 13b is difficult to be transmitted to the housing 40 or the like via the wall member 60 or the space S. Therefore, the vibration of the vibrating bodies 13a and 13b is not diffused to the component such as the housing 40, and hence the touch panel 10 can be efficiently vibrated.

Furthermore, although slight volume change is caused in the space S inside the wall member 160 owing to the vibration of the vibrating bodies 13a and 13b disposed on the transparent protection plate 11, if the space S has a high airtightness, the air pressure variation in the space S is increased, and hence, the vibration may be transmitted to the housing 40, or the vibration energy may be easily diffused and attenuated through the pressure loss or the like. Therefore, the flexible wall member 61 includes the base member 61a and the flexible linear materials 61b each having one end fixed to the base member 61a and the other end which is a free end, so that the space S can be in communication with the space outside the wall member 160. Thus, air corresponding to the volume change of the space S flows through the wall member 160 as illustrated with arrows in FIG. 6, so as to suppress the air pressure variation in the space S.

In this manner, the air pressure variation in the space inside the wall member 160 caused by the vibration of the vibrating bodies 13a and 13b is relaxed so that attenuation of the vibration of the transparent protection plate 11 which is the operation panel can be suppressed. Therefore, the transparent protection plate 11 can be efficiently vibrated. Accordingly, increase of the electric power for driving the vibrating bodies 13a and 13b can be suppressed.

Although the entire wall member 160 corresponds to the flexible wall member 61 in the present embodiment, the air pressure variation in the space S can be suppressed as long as the flexible wall member 61 is included in at least a part of the wall member 160. Besides, in the present embodiment, the base member 61a is fixed to the transparent protection plate 11, the flexible linear materials 61b extend from the base member 61a toward the backlight unit 30, and the flexible linear materials 61b are in contact with the backlight unit 30. Alternatively, a structure in which the base member 61a is fixed to the backlight unit 30, the flexible linear materials 61b extend toward the transparent protection plate 11, and the flexible linear materials 61b are in contact with the transparent protection plate 11 can be employed. Further alternatively, a structure in which the wall member 160 has, in a part thereof, the structure in which the base member 61a is fixed to the transparent protection plate 11, the flexible linear materials 61b extend toward the backlight unit 30, and the flexible linear materials 61b are in contact with the backlight unit 30, and has, in another part thereof, the structure in which the base member 61a is fixed to the backlight unit 30, the flexible linear materials 61b extend toward the transparent protection plate 11, and the flexible linear materials 61b are in contact with the transparent protection plate 11 may be employed. Alternatively, the wall member 160 may include both the flexible wall member 61 having the base member 61a fixed to the transparent protection plate 11 and the flexible linear members 61b extending toward the backlight unit 30, and the flexible wall member 61 having the base member 61a fixed to the backlight unit 30 and the flexible linear materials 61b extending toward the transparent protection plate 11, with these flexible linear materials 61b disposed to overlap each other in a plan view thereof.

Figure 7:
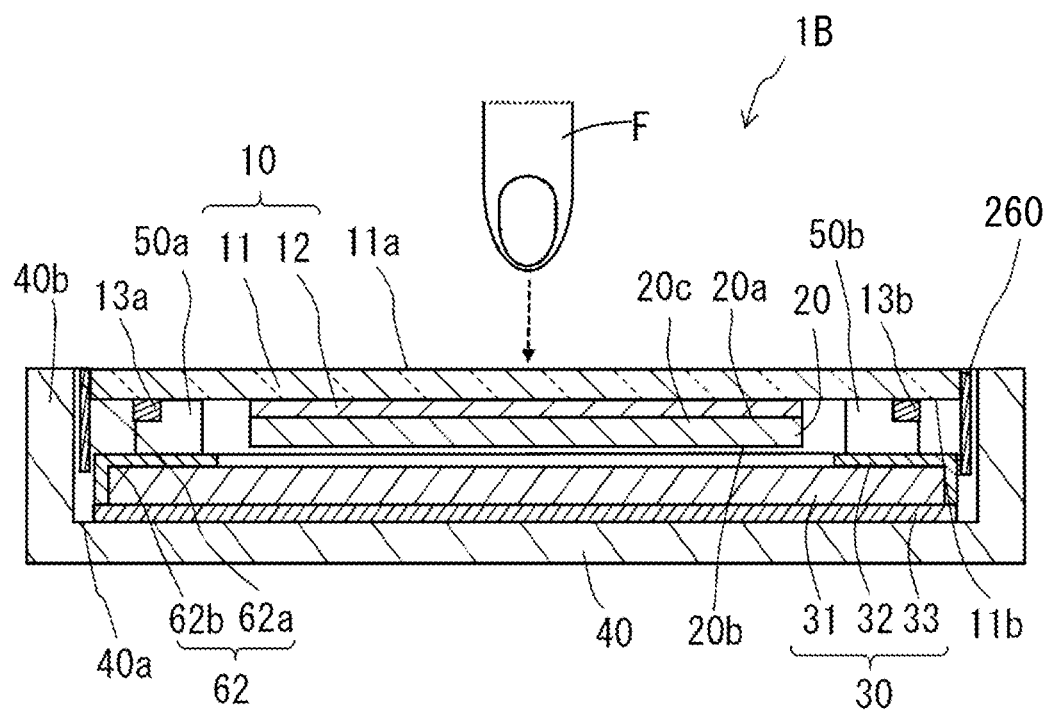
FIG. 7 is a cross-sectional view of an example of a display device according to a third embodiment.

FIG. 7 is a cross-sectional view illustrating an example of a display device according to a third embodiment. With respect to a liquid crystal display device 1B which is an example of the display device, an aspect of a wall member 260 is different from the wall member 160 of FIG. 5. At least a part of the wall member 260 includes a flexible wall member 62, which is the pressure variation relaxation section, formed of a material that can be easily bent. The flexible wall member 62 includes a base member 62a and a curtain-shaped wall material 62b. The base member 62a is fixed to an outer circumferential surface of the transparent protection plate 11 which is the operation panel. The curtain-shaped wall member 62b extends from the base member 62a toward the backlight unit 30. An end of the curtain-shaped wall member 62b on the opposite side to the base member 62a reaches an upper surface or a side surface of the backlight unit 30, and the flexible wall member 62 is disposed across the transparent protection plate 11 and the backlight unit 30 so as to externally surround the liquid crystal display panel 20. Therefore, enter of dust can be inhibited from entering the space S between the liquid crystal display panel 20 and the backlight unit 30. The curtain-shaped wall member 62b can be formed of a lightweight material little attenuating the vibration of the vibrating bodies 13a and 13b, and for example, the base member 62a and the curtain-shaped wall member 62b can be composed of a film-shaped or sheet-shaped member formed of a polyethylene terephthalate (PET) resin. It is noted that the base member 62a and the curtain-shaped wall member 62b may be integrally formed.

Figure 8:
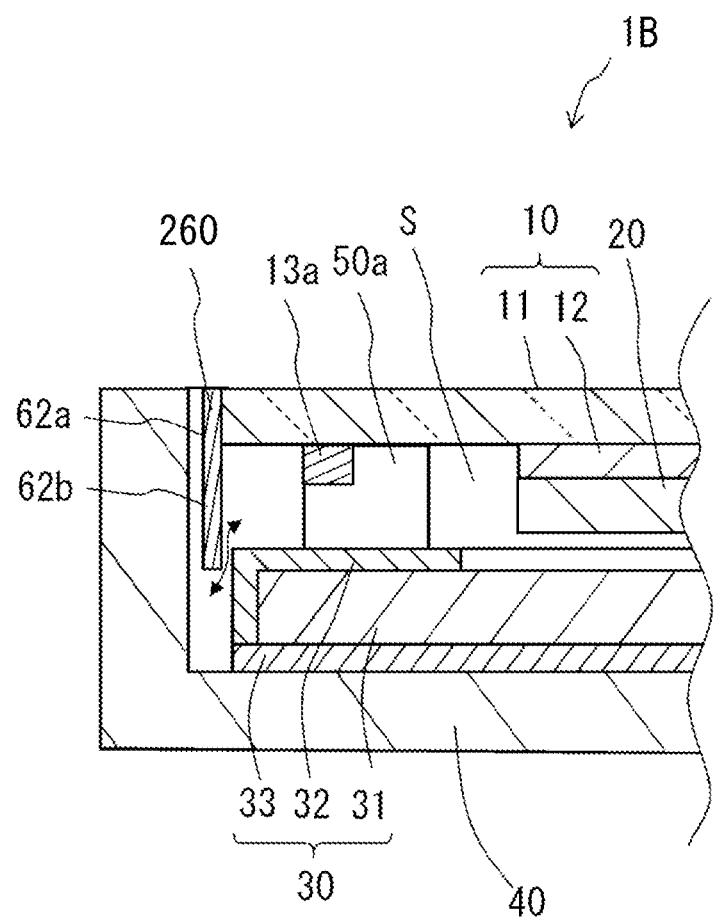
FIG. 8 is an enlarged cross-sectional view for explaining an air flow in the vicinity of a wall member.

FIG. 8 is an enlarged cross-sectional view for explaining an air flow in the vicinity of the wall member 260 according to the third embodiment. The curtain-shaped wall member 62b has a free end on the side opposite to the base member 62a, and there is a gap between the curtain-shaped wall member 62b and the side surface of the backlight unit 30, through which air can flow. As illustrated with an arrow in FIG. 8, the air can flow through the gap, and hence, the air pressure change in the space S caused by the vibration of the vibrating bodies 13a and 13b can be relaxed, attenuation of the vibration of the transparent protection plate 11 which is the operation panel can be further suppressed, and the transparent protection plate 11 can be more efficiently vibrated.

In the structure of FIG. 8, the curtain-shaped wall member 62b may have a protrusion in a portion of its free end facing the side surface of the backlight unit 30. In this case, the free end of the curtain-shaped wall member 62b can be inhibited from adhering to the side surface of the backlight unit 30 due to static electricity, and a gap between the free end of the curtain-shaped wall member 62b and the side surface of the backlight unit 30 can be secured. As a result, passing of air can be secured.

In addition, the curtain-shaped wall member 62b may have a single-piece structure, but may be divided into plural pieces in a vertical direction thereof. In this case, when the curtain-shaped wall member 62b vibrates by the vibration of the vibrating bodies 13a and 13b, since a new gap is produced between divided portions of the curtain-shaped wall member 62b, air passing property is improved. Further, since the new gap is produced only when the vibration is generated, decrease of the dust proofing effect can be suppressed.

Figure 9:
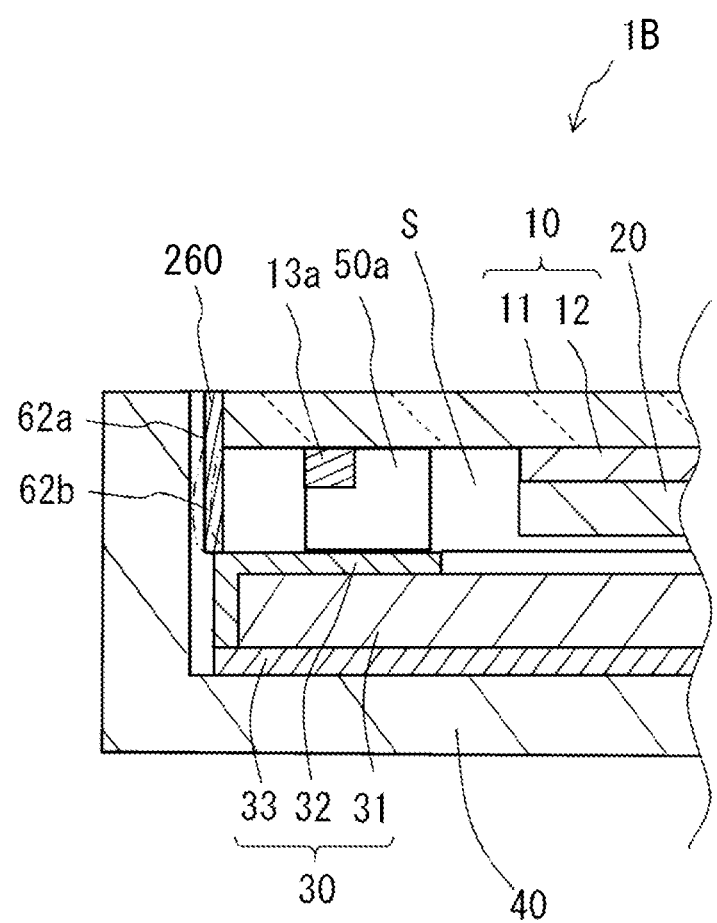
FIG. 9 is an enlarged cross-sectional view for explaining movement of the wall member.

FIG. 9 is an enlarged cross-sectional view for explaining movement of the wall member 260 in the third embodiment. The end of the curtain-shaped wall member 62b on the opposite side to the base member 62a may be in contact with the backlight unit 30. Even in such a case, since the end of the curtain-shaped wall member 62b on the opposite side to the base member 62a is a free end, the wall member is deformed by deflection as illustrated with a two-dot chain line in accordance with the vibration of the transparent protection plate 11. Therefore, the air pressure change in the space S can be relaxed by the shape change of the curtain-shaped wall member 62b. Accordingly, attenuation of the vibration of the transparent protection plate 11 can be further suppressed, and the transparent protection plate 11 can be further efficiently vibrated.

Although the base member 62a is fixed to the transparent protection plate 11 in the third embodiment, a structure in which the base member 62a is fixed to the backlight unit 30 with the curtain-shaped wall member 62b extending to the transparent protection plate 11 may be employed. Also in employing this structure, the air pressure change in the space S caused by the vibrating bodies 13a and 13b can be relaxed, attenuation of the vibration of the transparent protection plate 11 which is the operation panel can be further suppressed, and the transparent protection plate 11 can be further efficiently vibrated.

In the display device of the present disclosure, the liquid crystal display panel 20 is disposed in the space S inside the wall member 60, 160, 260, and the wall member 60, 160, 260 functions as a protection member for the liquid crystal display panel 20, and functions also as a dust proofing member. Besides, the elastic supporting members 50 and the vibrating bodies 13 are preferably disposed in the space S inside the wall member 60, 160, 260, and the wall member 60, 160, 260 functions as a protection member therefor, and functions also as the dust proofing member. Incidentally, the elastic supporting members 50 and the vibrating bodies 13 need not be always disposed in the space S inside the wall member 60, 160, 260, but may be disposed outside the wall member 60, 160, 260.

As mentioned above, although the present disclosure has been described in detail, the present disclosure is not limited to the above-described embodiments, and various modifications and improvements are possible without departing from the scope of the disclosure.

What is claimed is:

1. A display device, comprising:
    a substrate having a display section;
    a vibrating body disposed on the substrate;
    a support disposed so as to face the substrate apart therefrom;
    an elastic supporting member disposed between the substrate and the support, the elastic supporting member being elastically deformable in accordance with vibration of the vibrating body; and
    a wall member disposed across the substrate and the support so as to externally surround the display section,
    the wall member including a plurality of voids each extending through the wall member, the plurality of voids configured to control a volume of air passing through the wall member from a space surrounded by the wall member during vibration to suppress a variation in air pressure in the space caused by the vibrating body,
    the plurality of voids in the wall member being located at an entire peripheral portion of the substrate and surrounding the elastic supporting member in a plan view.

2. The display device according to claim 1, wherein the wall member is deformable in accordance with the vibration of the vibrating body, and the pressure variation relaxation section includes void portions which are constituted by a mesh structure to be ventilatable.

3. The display device according to claim 2, wherein a volume occupancy ratio of the void portions in the wall member is 40% or more and less than 100%.

4. The display device according to claim 2, wherein a pressure loss of air passing through the wall member during vibration of the substrate is in a range of 0.1 pascal to 100 pascals.

5. The display device according to claim 1, wherein the pressure variation relaxation section includes a flexible wall member having one end which is a fixed end fixed to either the substrate or the support, and the other end which is a free end.

6. The display device according to claim 5, wherein the flexible wall member includes a base member including the fixed end, and a plurality of flexible linear materials extending from the base member.

7. The display device according to claim 6, wherein each of the flexible linear materials has a thickness of 10 μm or more and 300 μm or less.

8. The display device according to claim 6, wherein a distance between adjacent ones of the flexible linear materials is 10 μm or more and 300 μm or less.

9. The display device according to claim 1, wherein the display section includes a liquid crystal display section.

10. The display device according to claim 9, wherein the support includes a backlight unit.

11. A display device, comprising:
a display panel having a display section;
an operation panel disposed so as to cover the display panel, the operation panel having an operation surface which is located on an opposite side to a side facing the display panel;
a vibrating body disposed on the operation panel;
a support disposed on the side facing the display panel so as to face the operation panel apart therefrom;
an elastic supporting member disposed between the operation panel and the support, the elastic supporting member being elastically deformable in accordance with vibration of the vibrating body; and
a wall member disposed across the operation panel and the support so as to externally surround the display section,
the wall member including a plurality of voids each extending through the wall member, the plurality of voids configured to control a volume of air passing through the wall member from a space surrounded by the wall member during vibration to suppress a variation in air pressure in the space caused by the vibrating body,
the plurality of voids in the wall member being located at an entire peripheral portion of the substrate and surrounding the elastic supporting member in a plan view.

12. The display device according to claim 11, wherein the wall member is deformable in accordance with the vibration of the vibrating body, and
the pressure variation relaxation section includes void portions which are constituted by a mesh structure to be ventilatable.

13. The display device according to claim 11, wherein the pressure variation relaxation section includes a flexible wall member having one end which is a fixed end fixed to either the substrate or the support, and the other end which is a free end.

14. A display device, comprising:
a substrate having a display section;
a vibrating body disposed on the substrate;
a support disposed so as to face the substrate apart therefrom;
an elastic supporting member disposed between the substrate and the support, the elastic supporting member being elastically deformable in accordance with vibration of the vibrating body; and
a wall member disposed across the substrate and the support so as to externally surround the display section, the flexible wall member including a plurality of flexible linear materials composed of a plurality of fibrous members extending from a base member,
the wall member including a plurality of voids each extending through the wall member, the plurality of voids configured to control a volume of air passing through the wall member from a space surrounded by the wall member during vibration to suppress a variation in air pressure in the space caused by the vibrating body.

* * * * *